US012656594B2

(12) United States Patent
Young et al.

(10) Patent No.: US 12,656,594 B2
(45) Date of Patent: Jun. 16, 2026

(54) METHODS AND APPARATUS FOR CALCULATING AND MAINTAINING AN OPTIMAL SAMPLE POSITION IN AN INTERFEROMETRIC MICROSCOPE

(71) Applicant: REFEYN LTD, Oxford (GB)

(72) Inventors: Gavin Young, Oxford (GB); Daniel Cole, Oxford (GB)

(73) Assignee: REFEYN LTD, Oxford (GB)

( * ) Notice: Subject to any disclaimer, the term of this patent is extended or adjusted under 35 U.S.C. 154(b) by 325 days.

(21) Appl. No.: 18/287,813

(22) PCT Filed: Apr. 22, 2022

(86) PCT No.: PCT/GB2022/051035
§ 371 (c)(1),
(2) Date: Oct. 20, 2023

(87) PCT Pub. No.: WO2022/223994
PCT Pub. Date: Oct. 27, 2022

(65) Prior Publication Data
US 2024/0192477 A1 Jun. 13, 2024

(30) Foreign Application Priority Data

Apr. 22, 2021 (GB) ...................................... 2105758

(51) Int. Cl.
*G02B 21/26* (2006.01)
*G02B 21/00* (2006.01)
*G02B 21/24* (2006.01)

(52) U.S. Cl.
CPC ......... *G02B 21/26* (2013.01); *G02B 21/0056* (2013.01); *G02B 21/006* (2013.01); *G02B 21/245* (2013.01)

(58) Field of Classification Search
CPC .. G02B 21/26; G02B 21/0056; G02B 21/006; G02B 21/245; G02B 21/244; G02B 21/361; G02B 21/14
See application file for complete search history.

(56) References Cited

U.S. PATENT DOCUMENTS

| | | | | |
|---|---|---|---|---|
| 10,816,784 B1 * | 10/2020 | Hantke | .............. | G01N 21/4795 |
| 2019/0004299 A1 * | 1/2019 | Kukura | .............. | G02B 21/0004 |
| 2019/0033054 A1 | 1/2019 | Vaupel et al. | | |

FOREIGN PATENT DOCUMENTS

| | | | |
|---|---|---|---|
| DE | 102008015885 A1 | 10/2009 | |
| WO | WO-2015/197601 A1 | 12/2015 | |
| WO | WO-2018/011591 A1 | 1/2018 | |

OTHER PUBLICATIONS

Cole et al., "Label-free single-molecule imaging with numerical-aperture-shaped interferometric scattering microscopy," ACS Photonics 4(2):211-6 (Jan. 2017).

(Continued)

*Primary Examiner* — Jonathan M Hansen

(57) ABSTRACT

There is provided a method of calculating a temperature corrected sample position in an interferometric microscope, the method comprising projecting an autofocus beam onto the sample location to form a reflected ring of radiation, detecting an uncalibrated radius. R, of a peak of the annulus of the reflected ring which indicates an uncalibrated sample position, detecting one or more of the width of the annulus or an intensity of the annulus and calculating a calibrated radius $R_{norm}$ using at least one of the width of the annulus or the intensity of the annulus to determine the temperature dependent corrected sample position.

14 Claims, 5 Drawing Sheets

(56) References Cited

OTHER PUBLICATIONS

Corrected Search Report under Section 17 dated Sep. 30, 2021, for British Patent Application No. 2105758.3, Young et al., "Methods and apparatus for calculating and maintaining the optimal sample position in focus an interferometric microscope," filed Apr. 22, 2021 (1 page).

International Search Report and Written Opinion mailed Aug. 1, 2022, for International Application No. PCT/GB2022/051035, Young et al., "Methods and apparatus for calculating and maintaining an optimal sample position in an interferometric microscope," filed Apr. 22, 2022 (12 pages).

Kukura et al., "High-speed nanoscopic tracking of the position and orientation of a single virus," Nat Methods 6(12):923-7 (2009) (8 pages).

Ortega Arroyo et al., "Interferometric scattering microscopy and its combination with single-molecule fluorescence imaging," Nat Protoc. 11(4):617-33 (Mar. 2016).

Ortega-Arroyo et al., "Interferometric scattering microscopy (ISCAT): new frontiers in ultrafast and ultrasensitive optical microscopy," Phys Chem Chem Phys. 14(45):15625-36 (2012) (13 pages).

* cited by examiner

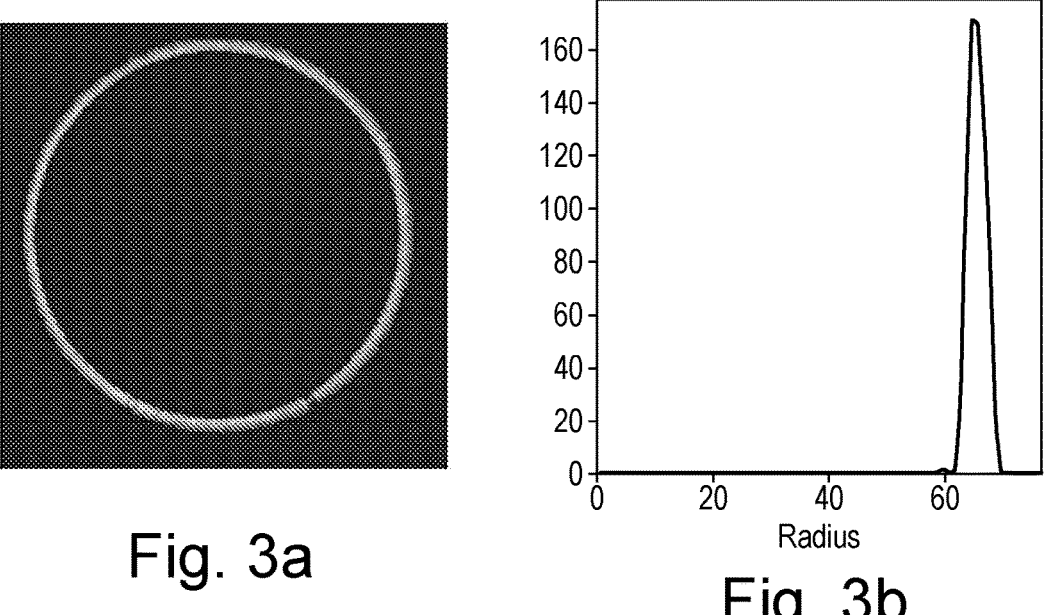
Fig. 3a
Fig. 3b
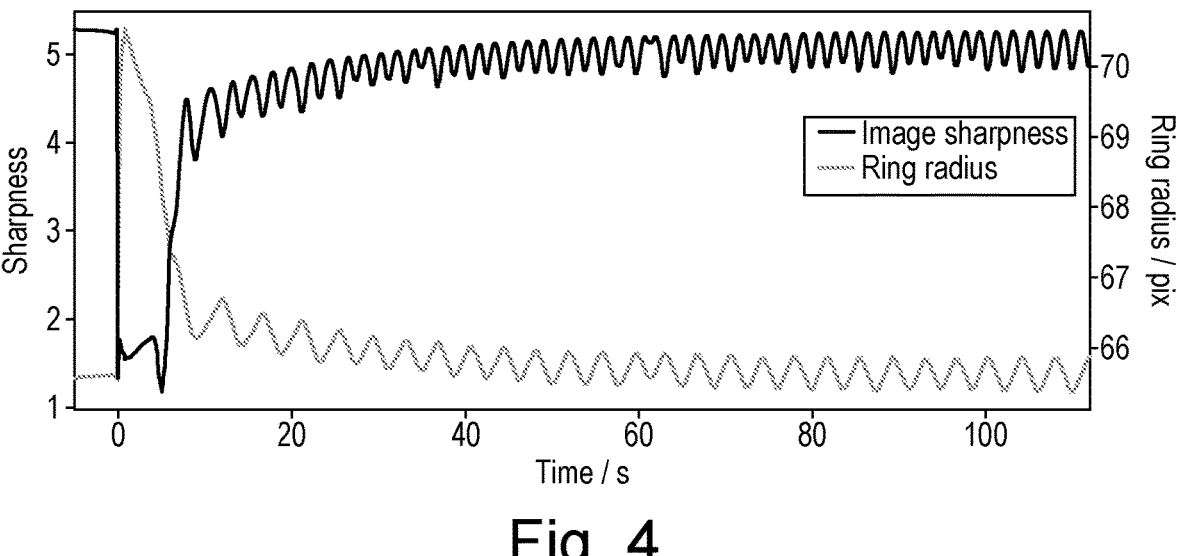
Fig. 4

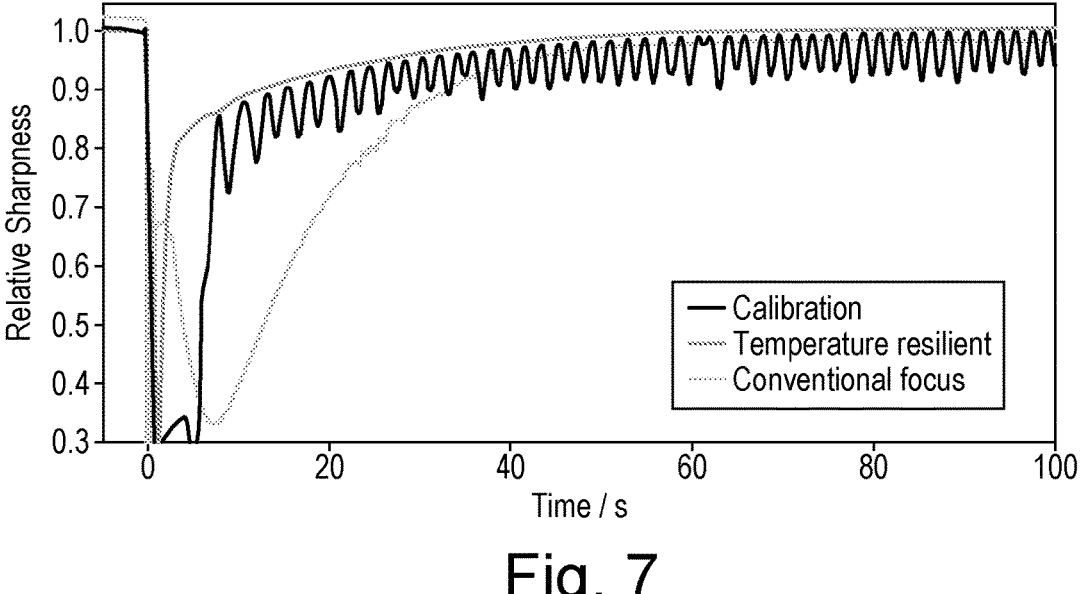
Fig. 7
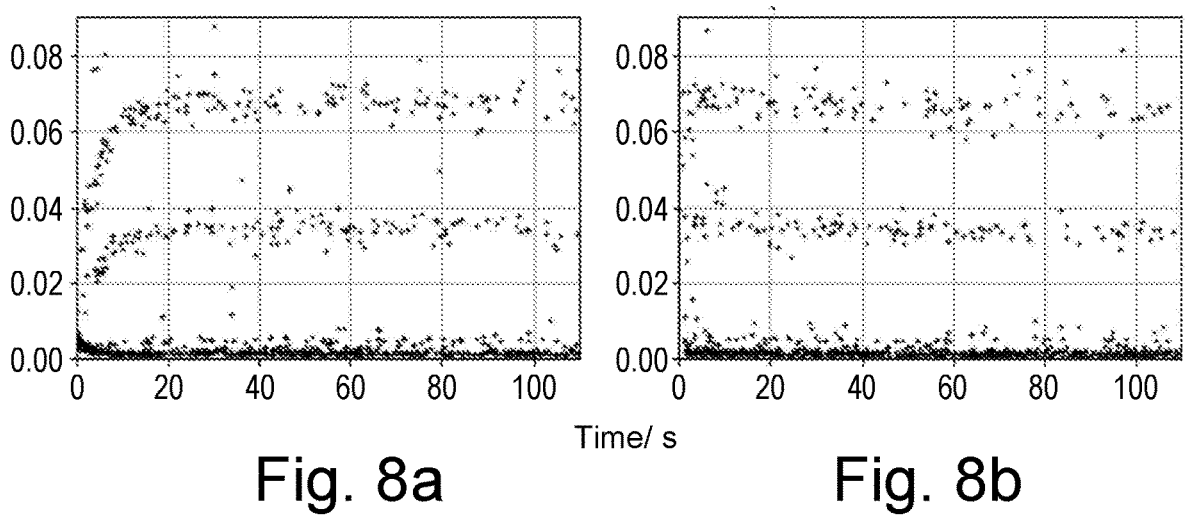
Fig. 8a                    Fig. 8b

METHODS AND APPARATUS FOR CALCULATING AND MAINTAINING AN OPTIMAL SAMPLE POSITION IN AN INTERFEROMETRIC MICROSCOPE

CROSS REFERENCE TO RELATED APPLICATIONS

This application is the U.S. national phase application of International Patent Application No. PCT/GB/2022/051035, filed on Apr. 22, 2022, which claims priority to United Kingdom Patent Application No. 2105758.3, filed Apr. 22, 2021, each of which is incorporated herein by reference in its entirety.

FIELD

The present invention relates to methods and apparatus for optimised interferometric scattering microscopy (referred to herein as iSCAT).

BACKGROUND iSCAT has materialized as a powerful approach to both single particle tracking with unique spatiotemporal resolution and label-free sensitivity down to the single molecule level and single particle mass determination by mass photometry and mass imaging iSCAT is disclosed, for example in Kukura et al., "High-speed nanoscopic tracking of the position and orientation of a single virus", Nature Methods 2009 6:923-935, and in Ortega Arroyo et al. "Interferometric scattering microscopy (iSCAT): new frontiers in ultrafast and ultrasensitive optical microscopy", Physical Chemistry Chemical Physics 2012 14:15625-15636.

Despite considerable potential, widespread application of iSCAT has been limited by the requirement for custom-built microscopes, unconventional cameras and complex sample illumination, limiting that capabilities of iSCAT for the robust and accurate detection, imaging and characterisation of objects as small as single molecules.

WO 2018/011591 discloses an interferometric scattering microscope comprising a novel, contrast-enhancing spatial mask configured to improve the relative amplitudes of reference and scattered light fields. The microscope described therein is capable of achieving sensitivity similar to that of conventional iSCAT techniques, but with a drastic reduction in the complexity and expense of implementation, to the extent that a conventional microscope could be configured to perform iSCAT by simple modification and inclusion of the spatial mask.

Mass photometry builds on the principles of iSCAT. Mass photometry measures the interference between the light scattered by a particle and the light reflected by the surface. The signal measured is called the mass photometry contrast (or interferometric contrast) and is directly correlated with molecular mass of the particle. In a mass photometer a second, autofocus, laser beam is reflected off the sample to detect the position of the sample. The position of the sample with respect to the focal plane is then actively stabilised (using measurements from the second, autofocus, laser beam) with a target position being set prior to the addition of a sample.

Samples to be examined may be stored at a different temperature from the ambient temperature of the apparatus. When a sample is added to an apparatus it equilibrates over a time period of between a few seconds and tens of seconds (during which data is being acquired). However, the temperature changes affect the optical properties of the elements of the apparatus, in particular the sample, sample holder and oil. Changing the temperature by the addition of the sample therefore results in a different apparent focus position of the sample (measured by the autofocus beam). Consequently the active stabilisation can push the sample away from the ideal focus position when the temperature is lower than it was when the target position was set prior to the addition of the sample. As the sample equilibrates it returns to the optimum focal position.

Being at the wrong focus position results in lower image contrast. Furthermore the contrast will change, and improve, over the data acquisition period while the sample equilibrates so that the contrast will change over time. There will therefore be broader and irregularly-shaped peaks in the final measured mass distribution.

Sample induced temperature changes cause reduced contrast, and thus poorer images and it is therefore an aim of the invention to reduce or eliminate this effect.

The present invention provides methods and apparatus for optimised iSCAT techniques which detect changes in focus position, both due to temperature induced changes in the focus position and temperature induced changes in the measurement of the focus position.

SUMMARY OF INVENTION

According to an aspect of the present invention there is provided a method of calculating a temperature corrected sample position for an interferometric microscope, the method comprising projecting an autofocus beam onto the sample location to form a reflected ring of radiation, detecting an uncalibrated radius, R, of a peak of the annulus of the reflected ring which indicates an uncalibrated sample position, detecting one or more of the width of the annulus or an intensity of the annulus, and calculating a calibrated radius $R_{norm}$ using at least one of at least the width of the annulus or the intensity of the annulus to determine the temperature corrected sample position. The autofocus beam can be focused onto the sample location. The beam, such as the autofocus beam, may be focused by the objective lens of the interferometric microscope. Once the temperature corrected sample position has been determined the position of the sample can be adjusted accordingly.

The step of calculating temperature corrected sample position also uses a scaling factor and the calibrated radius may be given by:

$$R_{norm} = \frac{R}{p_{scale}}$$

where $p_{scale}$ is given by:

$$p_{scale} = f(p - p_0) + R_0$$

wherein parameter p is one of the width of the annulus, the intensity of the annulus or a combination of the width and intensity of the annulus, $R_0$ and $p_0$ are values for the radius of the annulus and the parameter p in focus and at an equilibrated temperature and f is a calibration factor.

The parameter p is preferably given by:

$$p = \frac{annulus\ width}{annulus\ intensity}$$

Both the annulus width and the annulus intensity can be affected by the laser intensity so taking a ratio of the two reduces this effect. However, as an alternative the annulus width, the annulus intensity or some other combination of the two could be used as parameter p.

The scaling factor f is preferably determined by experimentation.

The interferometric microscope may be an iSCAT and the autofocus beam may have a wavelength in the range 600-650 nm. The reflected light may be passed through a spatial filter, the spatial filter being configured to effect a reduction in intensity on incident radiation, the reduction in intensity being greater within a predetermined numerical aperture.

According to the invention there is provided an interferometric scattering microscope comprising a sample holder for holding a sample in a sample location, an illumination source arranged to provide illuminating light, a detector, an optical system being arranged to direct illuminating light onto the sample location and being arranged to collect output light in reflection, the output light comprising both light scattered from the sample location and illuminating light reflected from the sample location, and to direct the output light to the detector, and computer program means configured to instruct the apparatus to carry out the steps according to any one of the preceding claims. There may additionally be an actuator to move the sample holder in response to the temperature corrected measured sample position.

The present invention may be applied with advantage to a sample comprising objects having a scattering cross section with respect to the illuminating light of $10^{-15}$ m$^2$ or less. Typically such objects may also have a scattering cross section with respect to the illuminating light of $10^{-26}$ m$^2$ or more, i.e. within a range from $10^{-15}$ m$^2$ from $10^{-26}$ m$^2$. Examples of objects that may be studied include proteins or small aggregates thereof as well as metallic, organic or inorganic nanoparticles.

In order to image objects that are very weak scatterers, the spatial filter is arranged to pass output light with a reduction in intensity within the predetermined numerical aperture to $10^{-2}$ of the incident intensity or less. Typically, the spatial filter may be arranged to pass output light with a reduction in intensity within the predetermined numerical aperture to $10^{-4}$ of the incident intensity or more, for example in the range from $10^{-2}$ to $10^{-4}$ of the incident intensity.

FIGURES

To allow better understanding, embodiments of the present invention will now be described by way of non-limitative example with reference to the accompanying drawings, in which:

FIG. 3a depicts the annulus of the autofocus beam;

FIG. 3b depicts a chart of the autofocus beam and is a plot of radius vs intensity;

FIG. 4 depicts a chart of image sharpness and measured radius over time (s);

FIG. 7 depicts a plot of image sharpness over time (s) after addition of ice cold water; and FIGS. 8a and 8b depict plots of single molecule contrast over time (s) for a protein sample (IgM).

DETAILED DESCRIPTION

In the systems and methods described herein, the light used may be: ultraviolet light (which may be defined herein as having wavelengths in the range from 10 nm to 380 nm); visible light (which may be defined herein as having wavelengths in the range from 380 nm to 740 nm); infrared light (which may be defined herein as having wavelengths in the range from 740 nm to 300 µm). The light may be a mixture of wavelengths. Herein, the terms 'optical' and 'optics' are used to refer generally to the light to which the methods are applied.

Figure 1:
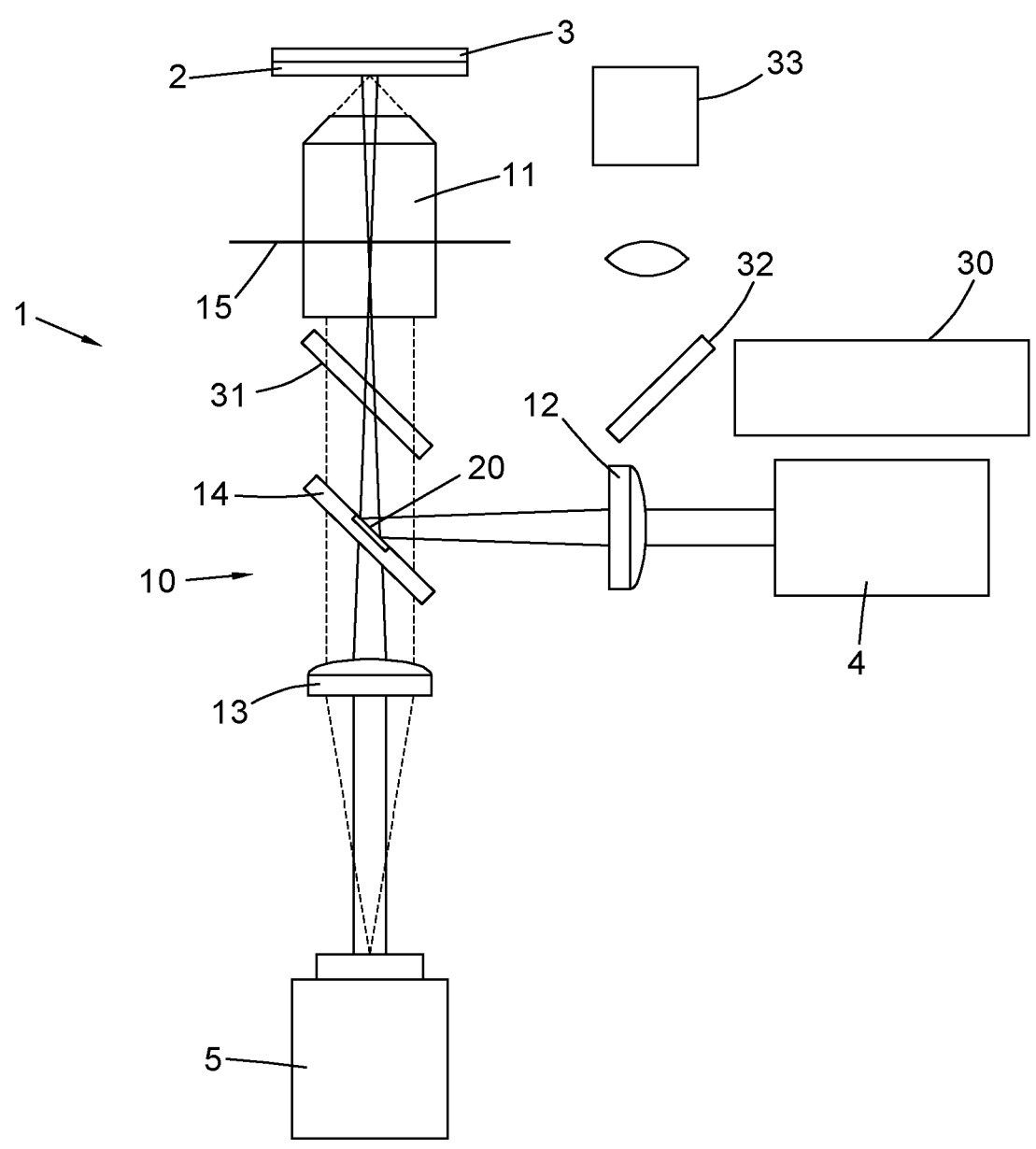
FIG. 1 is a schematic diagram of an iSCAT microscope according to the invention also the imaging beam.

FIG. 1 illustrates an iSCAT microscope configurations disclosed in WO 2018/011591 which have a number of structural features and functionalities in common with the apparatus and methods of the present invention.

The disclosure of WO 2018/011591 is incorporated herein by reference, however for completeness the following description will set out the components and functionalities of the iSCAT microscope of the present invention which are in common with those of WO 2018/011591 and which are shown in FIG. 1, then describe the various improvements to said configurations provided by the present disclosure and provide example embodiments thereof.

FIG. 1 illustrates an iSCAT microscope 1 which is arranged as follows.

The microscope 1 includes the following components that, except for the spatial filter described in more detail below, have a construction that is conventional in the field of microscopy.

The microscope 1 comprises a sample holder 2 for holding a sample 3 at a sample location. The sample 3 may be a liquid sample comprising objects to be imaged, which are described in more detail below. The sample holder 2 may take any form suitable for holding the sample 3. Typically, the sample holder 2 holds the sample 3 on a surface, which forms an interface between the sample holder 2 and the sample 3. For example, the sample holder 2 may be a coverslip and/or may be made from glass. The sample 3 may be provided on the sample holder 2 in a straightforward manner, for example using a micropipette.

The microscope 1 further comprises an illumination source 4 and a detector 5.

The illumination source 4 is arranged to provide illuminating light. The illuminating light may be coherent light. For example, the illumination source 4 may be a laser. The wavelength of the illuminating light may be selected in dependence on the nature of the sample 3 and/or the properties to be examined. In one example, the illuminating light has a wavelength of 405 nm.

Optionally, the illumination light may be modulated spatially, to remove speckle patterns that arise from the coherent nature of the illumination and laser noise, for example as detailed in Kukura et al., "High-speed nanoscopic tracking of the position and orientation of a single virus", Nature Methods 2009 6:923-935.

The detector 5 receives output light in reflection from the sample location. Typically, the microscope 1 may operate in a wide-field mode, in which case the detector 5 may be an image sensor that captures an image of the sample 3. The microscope 1 may alternatively operate in a confocal mode, in which case the detector 5 may be an image sensor or may be a point-like detector, such as a photo-diode, in which case a scanning arrangement may be used to scan a region of the sample 3 to build up an image. Examples of image sensors that may be employed as the detector 5 include a CMOS (complementary metal-oxide semiconductor) image sensor or a CCD (charge-coupled device).

The microscope 1 further comprises an optical system 10 arranged between the sample holder 2, the illumination source 4 and the detector 5. The optical system 10 is arranged as follows to direct illuminating light onto the sample location for illuminating the sample 3, and to collect output light in reflection from the sample location and to direct the output light to the detector 5.

The optical system 10 includes an objective lens 11 which is a lens system disposed in front of the sample holder 2. The optical system 10 also includes a condenser lens 12 and a tube lens 13.

The condenser lens 12 condenses illuminating light from the light source 11 (shown by continuous lines in FIG. 1) through the objective lens 11 onto the sample 3 at the sample location.

The objective lens 11 collects the output light which comprises both (a) illuminating light reflected from the sample location (shown by continuous lines in FIG. 1), and (b) light scattered from the sample 3 at the sample location (shown by dotted lines in FIG. 1). The reflected light is predominantly reflected from the interface between the sample holder 2 and the sample 3. Typically, this is a relatively weak reflection, for example a glass-water reflection. For example, the intensity of the reflected illuminating light may be of the order of 0.5% of the intensity of the incident illuminating light. The scattered light is scattered by objects in the sample 3.

In a similar manner to conventional iSCAT, scattered light from objects at or close to the surface of the sample constructively interfere with the reflected light and so are visible in the image captured by the detector 5. This effect differs from a microscope operating in transmission wherein the illuminating light that reaches the detector is transmitted through the depth of the sample leading to a much smaller imaging contrast.

As shown in FIG. 1, the reflected illuminating light and the scattered light have different directionalities. In particular, the reflected illuminating light has a numerical aperture resulting from the geometry of the beam of light output by the light source 4 and the optical system 6. The scattered light is scattered over a large range of angles and so fills larger numerical aperture than the reflected illuminating light.

The tube lens 13 focuses the output light from the objective lens 11 onto the detector 5.

The optical system 6 also includes a beam splitter 14 that is arranged to split the optical paths for the illuminating light from the light source 4 and the output light directed to the detector 5. Except for the provision of a spatial filter as described below, the beam splitter 14 may have a conventional construction that provides partial reflection and partial transmission of light incident thereon. For example, the beam splitter 14 may be a plate, typically provided with a film, which may be metallic or dielectric, arranged at 45° to the optical paths. Alternatively, the beam splitter 14 may be a cube beam splitter formed by a matched pair of prisms having a partially reflective film at the interface between the prisms. Alternatively, the beam splitter 14 may be a polarising beam splitter, used in combination with a quarter wave plate between the beam splitter 14 and the sample 3.

In the example shown in FIG. 1, the light source 4 is offset from the optical path of the objective lens 11 so that the illuminating light from the light source 4 is reflected by the beam splitter 14 into the objective lens 11, and conversely the detector 5 is aligned with the optical path of the objective lens 11 so that the output light from the sample location is transmitted through the beam splitter 14 towards the detector 5.

In addition to the components described above that may be of a conventional construction, the microscope 1 includes a spatial filter 20. In the example shown in FIG. 1, the spatial filter 20 is formed on the beam splitter 14 and is thereby positioned behind the back aperture of the objective lens 11, and so directly behind the back focal plane 15 of the objective lens 11. Thus, the spatial filter 20 may be implemented without entering the objective lens as in phase contrast microscopy. Placing the spatial filter directly behind the entrance aperture of the objective rather than in a conjugate plane (for example as described below) has the distinct advantage of strongly suppressing back reflections originating from the numerous lenses within high numerical aperture microscope objectives. This, in turn, reduces imaging noise, lowers non-interferometric background and reduces the experimental complexity, number of optics and optical pathlength leading to increased stability of the optical setup and thus image quality.

However this location is not essential and a spatial filter having an equivalent function may be provided elsewhere as described below.

The spatial filter 20 is thereby positioned to filter the output light passing to the detector 5. In the example shown in FIG. 1 in which the detector 5 is aligned with the optical path of the objective lens 11, the spatial filter 20 is therefore transmissive.

The spatial filter 20 is partially transmissive and therefore passes the output light, which includes the reflected illumination light, but with a reduction in intensity. The spatial filter 20 is also aligned with the optical axis and has a predetermined aperture so that it provides a reduction in intensity within a predetermined numerical aperture. Herein, numerical aperture is defined in its normal manner as being a dimensionless quantity characterising a range of angles with respect to the sample location from which the output light originates. Specifically, the numerical aperture NA may be defined by the equation $NA = n \cdot \sin(\theta)$, where $\theta$ is the half angle of collection and n is the refractive index of the material through which the output light passes (for example the material of the components of the optical system 6).

Figure 2:
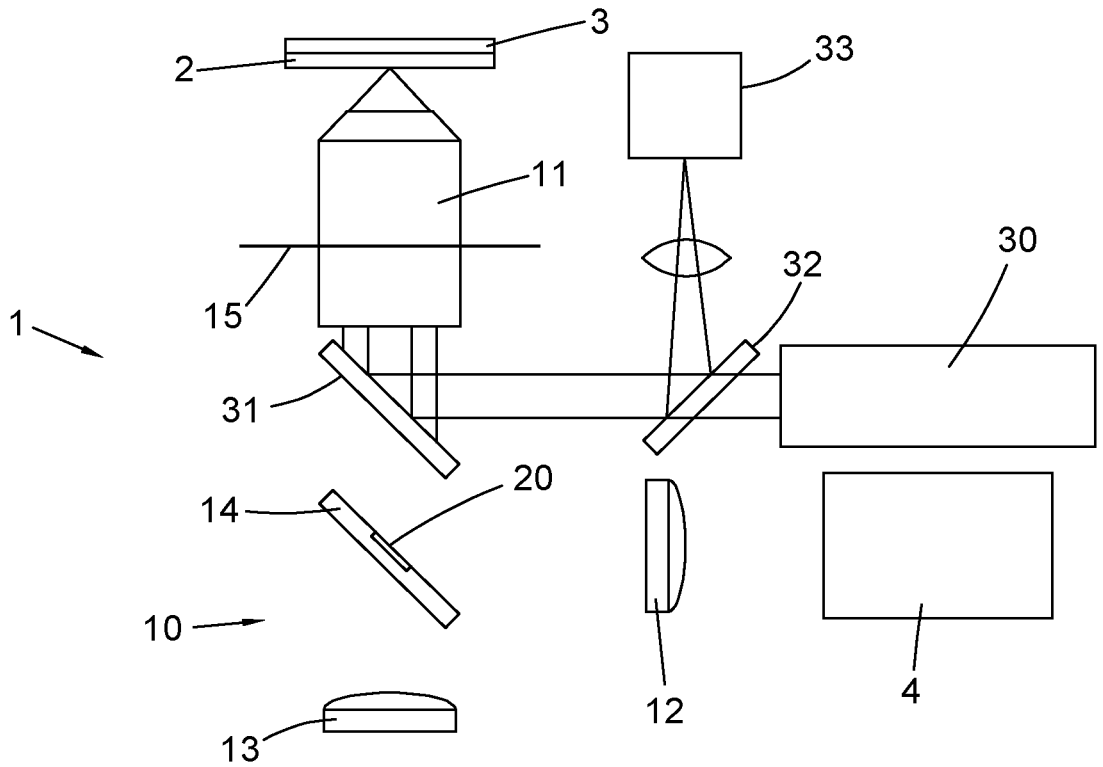
FIG. 2 is a schematic diagram of an iSCAT microscope depicting the autofocus beam.
Figure 2:
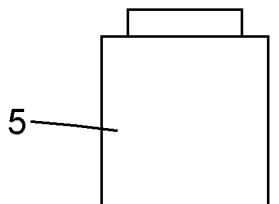

FIG. 2 depicts the same apparatus as FIG. 1 but instead of the imaging beam depicts the autofocus beam with a wavelength of 635 nm. The imaging beam and the autofocus beam would usually be operational at the same time. However, for clarity, they have been depicted here on separate figures.

The autofocus beam is a wide collimated beam generated by an autofocus source 30 and which is directed to the objective lens 11 via a dichroic mirror 31. The objective lens focuses the autofocus beam towards the sample location. Light below the critical angle mostly passes through the sample holder and sample, although some is reflected. However, light approaching the sample holder/sample interface above the critical angle is reflected due to total internal reflection. This generates an annulus of light, as can be seen in FIG. 3*a*. FIG. 3*b* depicts a chart of the intensity of the annulus. The autofocus beam is reflected by a partial mirror 32 to an autofocus detector 33.

If the distance of the sample holder from the objective lens is increased the radius of the annulus increases and if the distance of the sample holder from the objective lens is decreased the radius of the annulus decreases. However, the radius of the ring can also be affected by the temperature of the sample holder and sample.

As well as measuring the radius of the ring the intensity of the ring and the width of the ring can be measured, which are also affected by the focus position. However, in addition to the radius of the ring being affected by the temperature of the sample holder and the sample, the width and intensity of the ring are also affected. By detecting variations in the width and/or intensity of the ring variations due to temperature fluctuations can be identified and the effect of the temperature sensitivity cancelled out.

The relationship between the radius of the ring and the ring width and/or intensity must be measured as a function of temperature. Once a scaling factor has been calculated a rescaled radius (or calibrated radius) $R_{norm}$ can be deduced:

$$R_{norm} = \frac{R}{p_{scale}}$$

where R is the measured ring radius and $p_{scale}$ is given by:

$$p_{scale} = f(p - p_0) + R_0$$

where p is the ratio of the ring width to ring intensity, $R_0$ and $p_0$ are values for the radius of the annulus and the parameter p in focus and at an equilibrated temperature and f is an empirically calculated calibration factor.

The parameter p is given by:

$$p = \frac{ring\ width}{ring\ intensity}$$

Both the ring width and the ring intensity can be influenced by changes in the laser power incident on the sample so taking the ratio between them reduces this effect.

However, as an alternative to using a ratio of the ring width to ring intensity as p, either the ring width of the ring intensity could be used.

The rescaled radius $R_{norm}$ more accurately indicates the optimal sample position relative to the focus position of the system and so the position of the sample holder can be adjusted accordingly.

The autofocus beam is measured at a rate of several tens of Hz while the temperature changes typically equilibrate over several seconds. The parameter p can be averaged over several images in order to reduce noise, while still maintaining sufficient time resolution to capture the temperature-induced changes.

Calibration of f

To calibrate f a small volume (~5 μl) of room temperature water was added to a well on a glass coverslip. After allowing a couple of minutes for the temperature of the water to equilibrate with the instrument, the sample was positioned in focus (by maximising the sharpness of the image of the glass surface), and acquisition of images of both the main iSCAT camera and the secondary focus control camera were begun.

A relatively large volume (~30 μl) of ice-cold water was then added to the well on the glass coverslip to induce a large temperature drop. To identify the optimal focus position (i.e. maximum sharpness), the sample was scanned up and down through the focus position as the temperature returned to the equilibrium temperature and this is depicted in FIG. 4. From the iSCAT images of the glass surface the image sharpness as a function of time was extracted, while the ring radius, width and intensity over time were extracted from the from the focus control images. The peaks in the iSCAT image sharpness correspond to the time when the sample is in focus so the corresponding values for ring radius, width and intensity are extracted at those times. When the timestamps of the frames of the two cameras do not match the values are interpolated. These values correspond to the values of these parameters when the sample is in focus as a function of temperature, without explicitly knowing what the temperature is.

Figure 5:
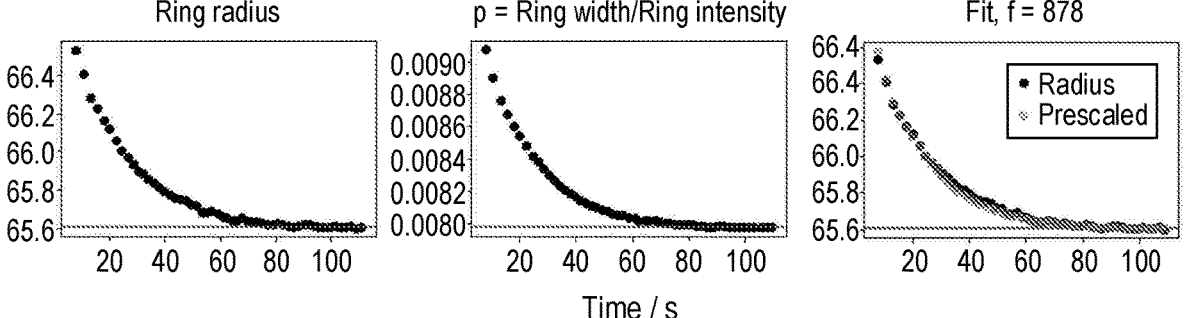
FIG. 5 depicts the ring radius, parameter p and the scaling factor f over time.

The target value for the parameter p is given by the values to which the ring width and ring intensity tend towards at long times. The scaling factor f is the determined as that which best maps the rescaled parameter $p_{scale}$ onto the measured values for the radius at focus. This is shown in FIG. 5.

Figure 6:
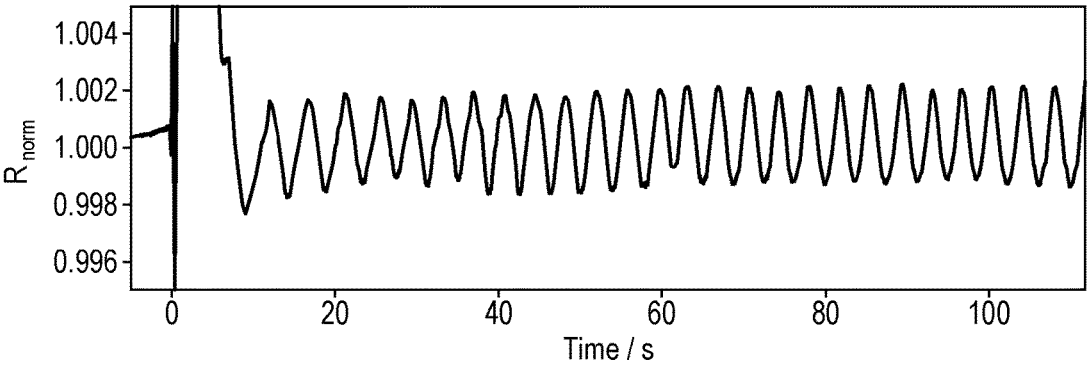
FIG. 6 depicts the normalised radius (R$_{norm}$) over time (s) with a value of 1 when in focus.

The detected normalised radius can be inspected and is shown in FIG. 6. The zig zag pattern illustrates the continued sensitivity to focus as the sample is scanned up and down but a constant target value of 1 is maintained as the temperature increases.

Experiment 1

The invention can be tested by adding cold water to a sample and assessing the image sharpness using a conventional method (i.e. without using a calibrated radius cancelling the effects of temperature) and using a calibrated radius. This can be seen in FIG. 7 in which cold water is added to the sample at time 0. A first line shows the image sharpness using a conventional method, a second line shows a calibration run (as described above in conjunction with FIG. 4). A third line shows the sharpness using temperature resilient assessment of the radius, $R_{norm}$.

Experiment 2 The next experiment is to use protein samples on the sample holder. 5 μl of phosphate buffer solution is placed on the sample holder, allowed to equilibrate and then positioned in focus. A protein sample of IgM diluted in 10 μl of cold phosphate buffer solution is then added and measurements taken while the solution equilibrates. FIG. 8a shows the contrast with conventional focus control and FIG. 8b shows the contrast with temperature resilient focus control according to the invention. As can be seen, the temperature resilient focus control brings the sample back into focus more rapidly than the conventional method.

Experiment 3

The calibration procedure was repeated 15 times over a span of 4.5 hours during which the instrument was steadily warming up. The average scaling factor was 894±35, a (RMS) error of ~4%, with no discernible trend over time.

Finally, tests in which the scaling factor was deliberately varied by up to ~35% from the measured value found that even these relatively large deviations still provided good performance.

Method

The sample holder is positioned in the iSCAT at a reference position, preferably in the focal plane of the interferometric apparatus and the position of the sample holder is measured, by the autofocus beam, before the sample is added. Once the sample is added to the sample holder temperature changes can, as discussed above, occur causing the autofocus beam to appear out of focus, and thus the wrong position measured. By calibrating the radius of the autofocus beam using $$R_{norm} = \frac{R}{p_{scale}}$$

where $p_{scale}=1(p-p_0)+R_0$ the effect of the temperature variation on the measurement can be negated so the calibrated sample position determined and, if necessary, the position of the sample holder corrected so that it is at the reference position.

Alternative Formulation

An alternative way of implementing the invention is to use a target radius $R_{target}$ but to update the target radius according to the formula:

$$R_{target}=f(p-p_0)+R_0$$

The units and scale of the focus control metric remain the same but the target radius that the focus control loop aims for changes as a result of changes in temperature, measured through the width/intensity parameter, to ensure optimum focus is maintained.

The microscope 1 may be used to perform iSCAT for a wide range of applications including single molecule detection. A particular application is label-free imaging of weak scatterers, where objects of interest have to be invariably detected on top of a large background, which reduces the imaging contrast. The microscope 1 may be used for a wide range of studies and measurements, for example to measure any changes in refractive index, which includes, for example: single molecule binding/unbinding, phase transitions, clustering, assembly/disassembly, aggregation, protein/protein interactions, protein/small molecule interactions, high-sensitivity label-free imaging.

Thus, there are numerous applications for the microscope 1, ranging from fundamental research to industrial applications, for example in the pharmaceutical industry. As an example, iSCAT is currently the world's most sensitive label-free single molecule imaging biosensor, which could have significant impact for example on the surface plasmon resonance sensing market. In addition, as described above microscope 1 can be used in mass measurement, functioning as an accurate, precise and highly resolved single molecule mass spectrometer in solution, with many applications in research and industry.

Various further aspects and embodiments of the present invention will be apparent to those skilled in the art in view of the present disclosure.

"And/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

The invention claimed is:

1. A method of calculating a temperature corrected measured sample position in an interferometric microscope, the method comprising:

projecting an autofocus beam onto the sample location to form a reflected ring of radiation;

detecting an uncalibrated radius, R, of a peak of the annulus of the reflected ring which indicates an uncalibrated sample position;

detecting one or more of the width of the annulus or an intensity of the annulus;

calculating a calibrated radius $R_{norm}$ using at least one of the width of the annulus or the intensity of the annulus to determine the temperature corrected measured sample position.

2. A method according to claim 1 wherein the interferometric microscope is an iSCAT.

3. A method according to claim 1 wherein the step of calculating a temperature corrected measured sample position also uses a scaling factor.

4. A method according to claim 3 wherein calibrated radius is given by:

$$R_{norm} = \frac{R}{p_{scale}}$$

where $p_{scale}$ is given by:

$$p_{scale}=f(p-p_0)+R_0$$

wherein parameter p is one of the width of the annulus, the intensity of the annulus or a combination of the width and intensity of the annulus, $R_0$ and $p_0$ are values for the radius of the annulus and the parameter p at an equilibrated temperature and f is a calibration factor.

5. A method according to claim 4 wherein:

$$p = \frac{\text{annulus width}}{\text{annulus intensity}}$$

6. A method according to claim 4 wherein f is determined by experimentation.

7. A method according to claim 1 wherein the autofocus beam has a wavelength in the range 600-650 nm.

8. A method according to claim 1 further comprising moving the sample based on the temperature corrected measured sample position.

9. A method according to claim 1 wherein the autofocus beam is focused by the objective lens of the interferometric microscope.

10. A method according to claim 1 further comprising passing output light through a spatial filter, the spatial filter being configured to effect a reduction in intensity on incident radiation, the reduction in intensity being greater within a predetermined numerical aperture.

11. A method according to claim 1 wherein the light source is a coherent light source.

12. A method according to claim 1 wherein the sample position is the temperature corrected measured sample position is at the focal point of the interferometric microscope.

13. An interferometric scattering microscope comprising:

a sample holder for holding a sample in a sample location;

an illumination source arranged to provide illuminating light;

a detector;

an optical system being arranged to direct illuminating light onto the sample location and being arranged to collect output light in reflection, the output light comprising both light scattered from the sample location and illuminating light reflected from the sample location, and to direct the output light to the detector; and computer program means configured to instruct the apparatus to carry out the steps according to claim 1.

14. An interferometric scattering microscope according to claim 13 further comprising an actuator to move the sample holder in response to the corrected measured sample position.

\* \* \* \* \*